United States Patent
Potlapally et al.

(10) Patent No.: US 10,389,709 B2
(45) Date of Patent: Aug. 20, 2019

(54) SECURING CLIENT-SPECIFIED CREDENTIALS AT CRYPTOGRAPHICALLY ATTESTED RESOURCES

(71) Applicant: Amazon Technologies, Inc., Reno, NV (US)

(72) Inventors: Nachiketh Rao Potlapally, Arlington, VA (US); Andrew Jeffrey Doane, Vienna, VA (US); Eric Jason Brandwine, Haymarket, VA (US); Robert Eric Fitzgerald, Herndon, VA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/188,630

(22) Filed: Feb. 24, 2014

(65) Prior Publication Data

US 2015/0244716 A1 Aug. 27, 2015

(51) Int. Cl.
*H04L 29/06* (2006.01)
*H04L 9/32* (2006.01)
(Continued)

(52) U.S. Cl.
CPC .......... *H04L 63/0853* (2013.01); *G06F 21/57* (2013.01); *G06F 21/6209* (2013.01);
(Continued)

(58) Field of Classification Search
CPC ... H04L 63/12; H04L 63/0853; H04L 9/3234; G06F 21/57
See application file for complete search history.

(56) References Cited

U.S. PATENT DOCUMENTS 7,802,092 B1 9/2010 Kelly et al.
8,176,336 B1 5/2012 Mao et al.
(Continued)

FOREIGN PATENT DOCUMENTS

JP 2013528872 7/2013
KR 1020130044293 5/2013
(Continued)

OTHER PUBLICATIONS

Zou, Bingyu; Zhang, Huanguo; "Integrity Protection and Attestation of Security Critical Executions on Virtualized Platform in Cloud Computing Environment", International Conference on Green Computing and Communications; Internet of Things; Cyber, Physical and Social Computing, IEEE, Aug. 20-23, 2013, pp. 2071-2075.*

(Continued)

*Primary Examiner* — Victor Lesniewski
(74) *Attorney, Agent, or Firm* — Robert C. Kowert; Meyertons, Hood, Kivlin, Kowert & Goetzel, P.C.

(57) ABSTRACT

Methods and apparatus for securing client-specified credentials at cryptographically-attested resources are described. An indication is obtained that resources deployed for execution of a compute instance of a multi-tenant computing service at an instance host of a provider network meet a client's security criteria. An encrypted representation of credentials to be used at the compute instance to implement operations on behalf of a client is received at the instance host. The credentials are extracted from the encrypted representation using a private key unique to the instance host, used for the operations, and then removed from the instance host without being saved in persistent memory.

20 Claims, 10 Drawing Sheets

(51) Int. Cl.
*G06F 21/57* (2013.01)
*G06F 21/62* (2013.01)

(52) U.S. Cl.
CPC .......... *H04L 9/3234* (2013.01); *H04L 63/064* (2013.01); *H04L 63/12* (2013.01); *H04L 63/06* (2013.01); *H04L 63/0884* (2013.01)

(56) References Cited

U.S. PATENT DOCUMENTS

| | | | |
|---|---|---|---|
| 8,224,885 B1 | 7/2012 | Doucette et al. | |
| 8,250,379 B2* | 8/2012 | Thom et al. | 713/193 |
| 8,375,221 B1 | 2/2013 | Thom et al. | |
| 8,458,494 B1 | 6/2013 | Bogorad | |
| 8,522,018 B2 | 8/2013 | Molina et al. | |
| 8,621,078 B1 | 12/2013 | Mukerji et al. | |
| 8,694,786 B2* | 4/2014 | Augu | H04L 9/0897 380/227 |
| 8,799,997 B2* | 8/2014 | Spiers et al. | 726/3 |
| 8,909,928 B2* | 12/2014 | Ahmad | G06F 21/57 713/168 |
| 9,086,917 B1* | 7/2015 | Fitzgerald | G06F 8/60 |
| 9,100,827 B2 | 8/2015 | Adi | |
| 9,135,444 B2* | 9/2015 | Carter | G06F 21/33 |
| 9,225,707 B1* | 12/2015 | de Sousa | H04L 63/08 |
| 9,294,282 B1* | 3/2016 | Potlapally | H04L 9/3234 |
| 9,317,276 B2* | 4/2016 | Gilbert | G06F 8/65 |
| 9,418,220 B1* | 8/2016 | McKee | G06F 21/53 |
| 9,514,313 B2* | 12/2016 | Angelo | G06F 21/602 |
| 9,609,020 B2* | 3/2017 | White | H04L 63/20 |
| 2005/0105734 A1 | 5/2005 | Buer et al. | |
| 2005/0144440 A1 | 6/2005 | Catherman et al. | |
| 2006/0256107 A1 | 11/2006 | Scarlata | |
| 2007/0220009 A1 | 9/2007 | Morris et al. | |
| 2007/0226786 A1* | 9/2007 | Berger et al. | 726/9 |
| 2008/0046581 A1* | 2/2008 | Molina | H04L 63/08 709/229 |
| 2008/0104382 A1* | 5/2008 | Tarkkala | G06F 21/305 713/1 |
| 2008/0244569 A1* | 10/2008 | Challener | G06F 21/57 718/1 |
| 2008/0313627 A1* | 12/2008 | Segawa | G06F 21/572 717/171 |
| 2009/0070598 A1* | 3/2009 | Cromer | G06F 21/575 713/193 |
| 2009/0133097 A1* | 5/2009 | Smith | G06F 21/57 726/1 |
| 2009/0164770 A1* | 6/2009 | Zimmer | G06F 21/51 713/2 |
| 2009/0169012 A1* | 7/2009 | Smith et al. | 380/277 |
| 2010/0146611 A1* | 6/2010 | Kuzin | H04L 63/0815 726/8 |
| 2010/0146634 A1* | 6/2010 | Choi | G06F 21/10 726/26 |
| 2010/0242045 A1 | 9/2010 | Swamy et al. | |
| 2010/0268812 A1* | 10/2010 | Mohrmann et al. | 709/224 |
| 2011/0060947 A1* | 3/2011 | Song | G06F 21/53 714/37 |
| 2011/0237234 A1* | 9/2011 | Kotani | G06F 8/65 455/418 |
| 2011/0296201 A1* | 12/2011 | Monclus | G06F 21/53 713/190 |
| 2011/0302415 A1* | 12/2011 | Ahmad et al. | 713/168 |
| 2012/0246475 A1 | 9/2012 | Yoo et al. | |
| 2012/0275596 A1* | 11/2012 | Ureche et al. | 380/47 |
| 2012/0297205 A1 | 11/2012 | Yuen et al. | |
| 2013/0086383 A1* | 4/2013 | Galvao de Andrade et al. | 713/171 |
| 2013/0151848 A1 | 6/2013 | Baumann et al. | |
| 2013/0185812 A1* | 7/2013 | Lie et al. | 726/29 |
| 2013/0198797 A1* | 8/2013 | Raghuram | G06F 21/57 726/1 |
| 2013/0212385 A1* | 8/2013 | Schechter | G06F 21/31 713/168 |
| 2013/0218915 A1* | 8/2013 | Billau | H04W 12/10 707/755 |
| 2014/0006776 A1 | 1/2014 | Scott-Nash et al. | |
| 2014/0007087 A1 | 1/2014 | Scott-Nash et al. | |
| 2014/0026124 A1* | 1/2014 | Gilbert | G06F 21/575 717/124 |
| 2014/0047436 A1* | 2/2014 | Jayachandran | G06F 8/71 718/1 |
| 2014/0075522 A1* | 3/2014 | Paris | G06F 21/44 726/5 |
| 2014/0089658 A1* | 3/2014 | Raghuram | H04L 9/0825 713/155 |
| 2014/0109191 A1* | 4/2014 | Raghuram | H04L 67/1097 726/4 |
| 2014/0137180 A1* | 5/2014 | Lukacs | G06F 21/53 726/1 |
| 2014/0230024 A1* | 8/2014 | Uehara | H04L 63/1433 726/4 |
| 2014/0237239 A1* | 8/2014 | Hursti | H04L 9/32 713/168 |
| 2014/0281509 A1* | 9/2014 | Angelo | G06F 21/602 713/164 |
| 2014/0282889 A1 | 9/2014 | Ishaya et al. | |
| 2015/0106803 A1* | 4/2015 | Srivastava | G06F 9/45558 718/1 |
| 2015/0113587 A1* | 4/2015 | Gautam | G06F 21/57 726/1 |
| 2015/0127795 A1* | 5/2015 | Jagana | H04L 41/00 709/223 |
| 2015/0134953 A1* | 5/2015 | Seaborn | H04L 9/0861 713/168 |

FOREIGN PATENT DOCUMENTS

| | | |
|---|---|---|
| KR | 1020140117449 | 10/2014 |
| RU | 2518924 | 5/2013 |
| WO | 2009109811 | 9/2009 |
| WO | 2011152910 | 12/2011 |
| WO | 2012009231 | 1/2012 |
| WO | 2012047088 | 4/2012 |
| WO | 2013101178 | 7/2013 |
| WO | 20130112389 | 8/2013 |

OTHER PUBLICATIONS

Yu, Aimin; Qin, Yu; Wang, Dan; "Obtaining the Integrity of Your Virtual Machine in the Cloud", International Conference on Cloud Computing Technology and Science, IEEE, Nov. 29-Dec. 1, 2011, pp. 213-222.*
Bertholon, Benoit; Varrette, Sebastien; Bouvry, Pascal; "CertiCloud: a Novel TPM-based Approach to Ensure Cloud IaaS Security", International Conference on Cloud Computing, IEEE, Jul. 4-9, 2011, pp. 121-130.*
U.S. Appl. No. 13/932,828, filed Jul. 1, 2013, Nachiketh Rao Potlapally.
Amazon Web Services, "AWS CloudHSM Getting Started Guide", Nov. 5, 2013, pp. 1-45.
TCG, "TPM Main, Part 1 Design Principles", Mar. 1, 2011, pp. i-172.
TCG, "TPM Main, Part 2 TPM Structures", Mar. 1, 2011, pp. i-190.
TCG, "TPM Main, Part 3 Commands", Mar. 1, 2011, pp. i-328.
"Trousers FAQ", accessed Oct. 3, 2014, pp. 1-9.
U.S. Appl. No. 14/535,056, filed Nov. 6, 2014, Nachiketh Rao Potlapally.
International Search Report and Written Opinion in PCT/US2015/017354, dated Jun. 3, 2015, Amazon Technologies, Inc., pp. 1-9.
Extended European Search Report from PCT/US2015017354, dated Sep. 26, 2017, pp. 1-8.
Notice of Reasons for Refusal from Japanese Patent Application No. 2016-553869, dated Dec. 12, 2017, pp. 1-14.
Office Action from Canadian Application No. 2,939,925, Amazon Technologies Inc., dated Jul. 30, 2018, pp. 1-4.
Anonymous, "How to turn an old netbook into a NAS drive", dated Mar. 1, 2010, pp. 1-5.

(56) References Cited

OTHER PUBLICATIONS

Office Action from European Application No. 16739357.8-1222, dated Jun. 11, 2018 (Amazon Technologies, Inc.) pp. 1-8.

* cited by examiner

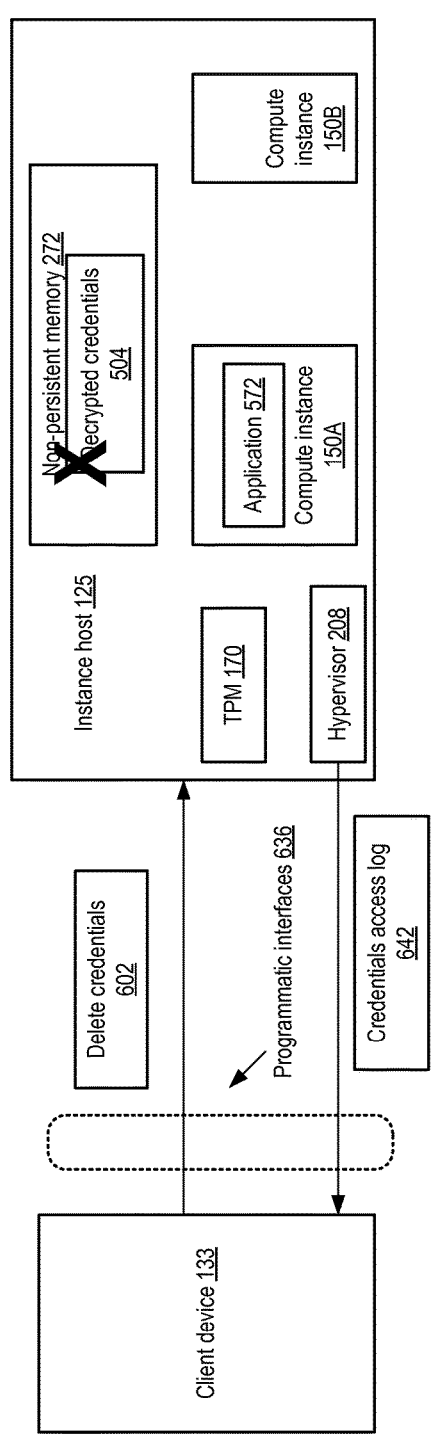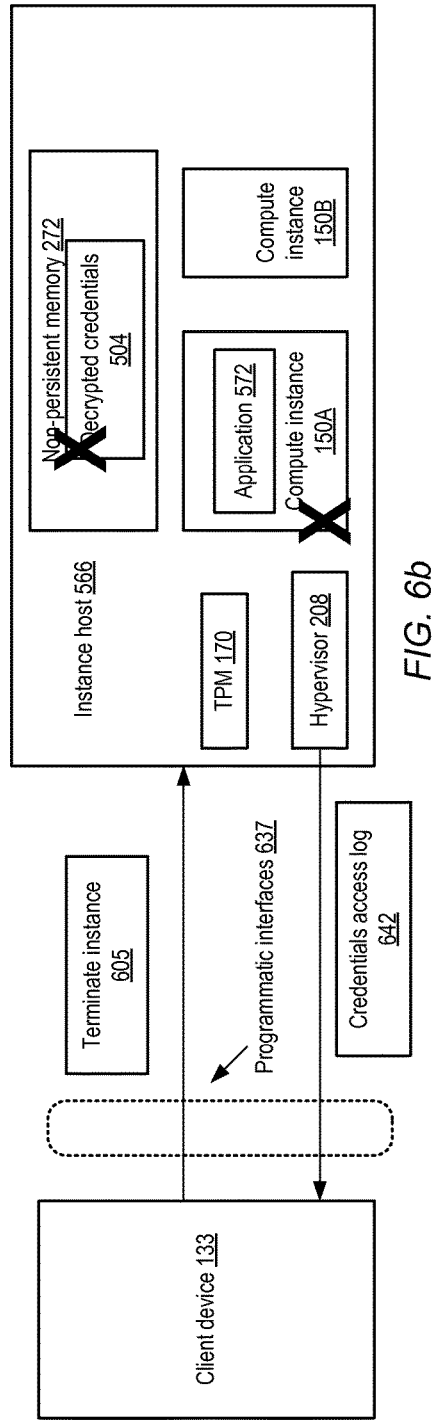

SECURING CLIENT-SPECIFIED CREDENTIALS AT CRYPTOGRAPHICALLY ATTESTED RESOURCES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine. Each such virtual machine can be thought of as a software simulation acting as a distinct logical computing system that provides users with the illusion that they are the sole operators and administrators of a given hardware computing resource, while also providing application isolation among the various virtual machines.

Traditionally, applications that require high levels of security have typically been implemented at customer data centers, where the organizations on whose behalf the applications are executed have complete control of the physical and computing environments. For cost and convenience reasons, some clients may wish to utilize virtualized computing services implemented at provider data centers for critical applications that require high security. However, a client may be reluctant to do so without some level of assurance that the execution environments being used meet the client's security requirements and have not been tampered with. In addition, in many cases security-related metadata such as keys and/or passwords required by some of the client's applications may be generated at client premises, or at other locations that are remote from the virtualization platforms that can be utilized for the applications. Even if an execution platform used for virtualized computing is itself deemed to be secure, potential clients may also wish to eliminate or at least reduce the probability of such metadata being obtained and misused by malicious third parties.

BRIEF DESCRIPTION OF DRAWINGS

FIGS. 6a and 6b illustrate respective examples of client requests that may result in the deletion of decrypted credentials from non-persistent memory at an instance host, according to at least some embodiments.

Figure 1:
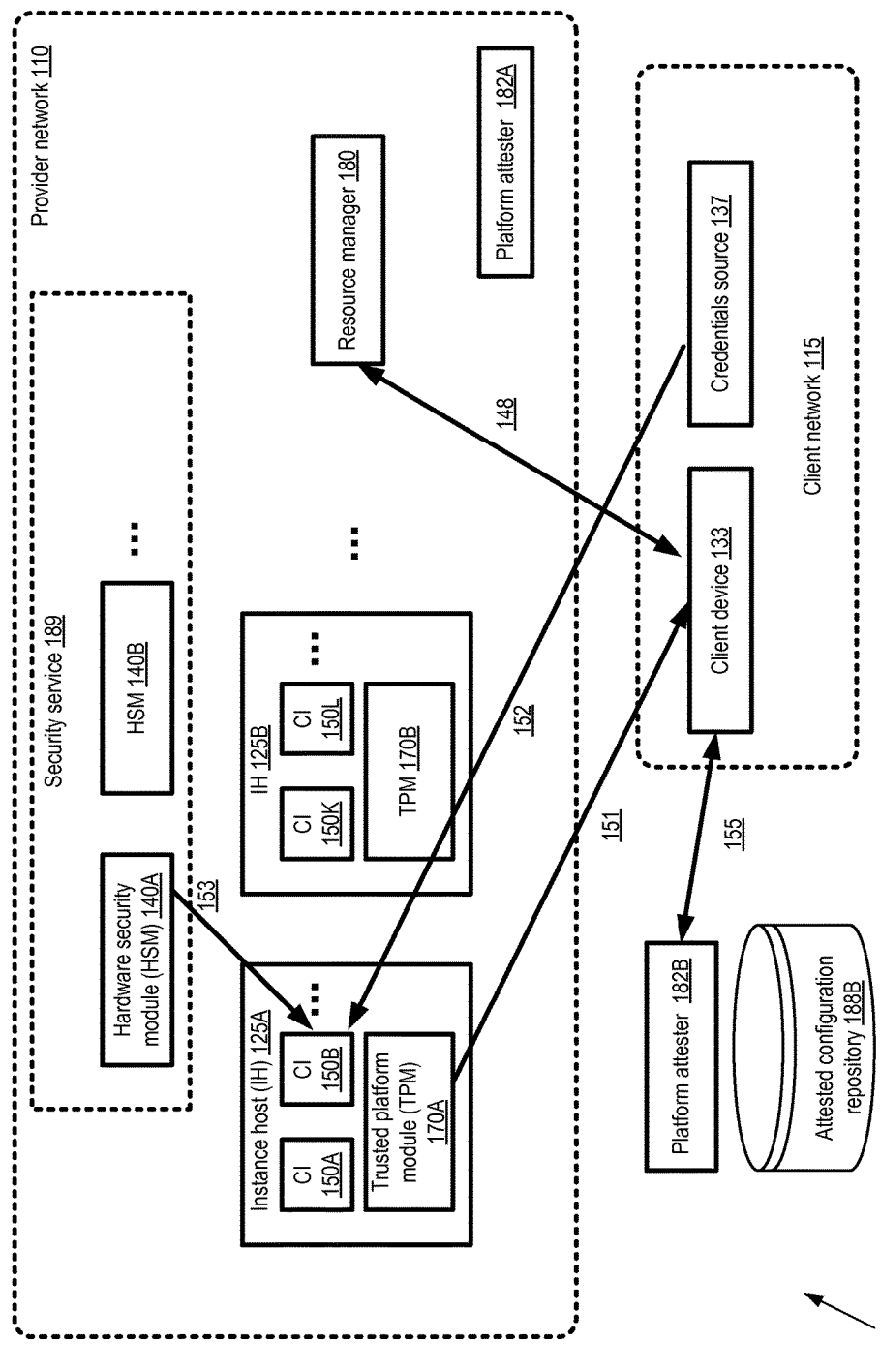
FIG. 1 illustrates an example system environment in which client-specified credentials may be secured at cryptographically attested resources of a provider network, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for securing client-specified credentials at cryptographically attested resources of a provider network are described. Networks set up by an entity such as a company or a public sector organization to provide one or more services (such as various types of multi-tenant and/or single-tenant cloud-based computing or storage services) accessible via the Internet and/or other networks to a distributed set of clients or customers may be termed provider networks in this document. The term "multi-tenant" may be used herein to refer to a service that is designed to implement application and/or data virtualization in such a manner that different client entities are provided respective customizable, isolated views of the service, such that one client to whom portions of the service functionality are being provided using a given set of underlying resources may not be aware that the set of resources is also being used for other clients. A provider network may support single-tenant services (such as for private cloud implementations) in some embodiments, either in addition to, or instead of, multi-tenant services. A given provider network may typically include several large data centers hosting various resource pools, such as collections of physical and/or virtualized computer servers, storage devices, networking equipment, security-related equipment and the like, needed to implement, configure and distribute the infrastructure and services offered by the provider.

In at least some embodiments, a virtual computing service of the provider network may bundle computing resources into units called "compute instances", each of which corresponds to a virtual machine implemented on some hardware platform (called an "instance host") selected by the computing service. In accordance with accepted virtualization approaches, details about the instance hosts (such as the absolute performance capabilities of processors or cores being used, or the specific data centers at which the instance hosts are physically located) as well as the mappings between compute instances and instance hosts (e.g., how many compute instances are run at a given instance host, or the identity of the clients whose instances share an instance host), may at least in some cases be unavailable to the clients on whose behalf compute instances are run. At each instance host, the computing service may typically deploy a virtualization management software stack, such as a hypervisor, an administrative operating system domain, and the like, which may also be inaccessible to the clients for obvious security reasons. In some embodiments, different types or categories of compute instances (e.g., "small", "medium" or "large" instances corresponding to one or more operating systems) may be defined by the computing service, with some indication of the relative capabilities of each instance type and the corresponding pricing policies being made available to potential clients. Given the instance type definitions, in one embodiment clients may be able to select how many instance of each type they wish to acquire within some hierarchical sub-unit of the provider network such as a loosely geographically-defined "region".

Some clients of the provider network may demand higher levels of security for at least some of their applications than others. (It is noted that the term application, as used herein, may refer to any type of executable program component or combination of components, which may run in user mode, kernel/system mode, or a combination of user and kernel/system modes.) In particular, in view of the fact that direct client access to the hardware and the virtualization management software stack at an instance host may be prohibited or at least highly constrained, clients may wish to obtain some level of assurance that a proposed execution environment to be used for a client application has not been tampered with or penetrated by malicious entities. In at least some embodiments, the virtual computing service may provide a mechanism for cryptographic attestation or certification (e.g., by trusted third parties) of at least a portion of the execution environment configured for the compute instances. The attestation may, for example, involve comparing some signature or unique value representing the execution platform that is to be used for a given compute instance on behalf of a client, with some set of pre-approved unique values corresponding to acceptable execution environments. For example, in one embodiment the service may utilize some combination of security hardware and software (such as a hardware or virtualized trusted platform module (TPM)) to compute one or more values intended to represent a unique encoding of a set of resources (e.g., various elements of firmware, software and/or hardware) used to implement a compute instance. The set of resources may be referred to herein as a "resource stack" of the execution environment. A TPM may in one embodiment comprise one or more cryptographic processors, attached for example to a motherboard slot of an instance host, or incorporated within an instance host using some other appropriate technique. In one implementation, the TPM may generate a hash value based on a variety of inputs representing respective elements of the instance host's configuration, including for example some combination of the BIOS (Basic Input/Output System), the hypervisor, the administrative operating system, the "guest" or non-administrative operating system corresponding to the compute instance, firmware at various devices, and/or the contents of a number of hardware registers. The generated hash value, which is intended to uniquely identify the execution environment, may then be provided to the client and/or to a trusted third party that can compare the hash value to an acceptable set of pre-computed hash values. If the hash value for the proposed execution environment matches one of the pre-computed values, or a specific pre-computed value selected by the client, this may provide the necessary assurance to the client that the proposed execution environment meets the client's security criteria. The hash function used may be selected in such a way that even a slight alteration to one of the input sources (e.g., the replacement of an executable module M1 within the hypervisor with another module M2 that has a single line of code changed with respect to M1) may result in a hash value mismatch with respect to the correspond pre-approved hash value.

Depending on the specific applications the client wants to run, various credentials such as security keys, passwords and the like that are originally generated or selected at the client network (or at other credentials sources that are not at the instance host) may be required at the compute instance where the applications run. A client may wish to ensure such credentials are kept from malicious parties during their transmission to the compute instance. Furthermore, for at least some types of credentials or other security-related metadata, the client may also wish to preclude the possibility that a local storage device such as a disk that contains the credentials is stolen or removed from the instance host where the application runs, or that the credentials are written to a remote storage device from which they could be accessed.

To meet such stringent security requirements, in at least some embodiments come combination of the following approaches may be used. First, the set of credentials may be encrypted (e.g., at the credentials source) using a public key Kpub whose corresponding private key Kpriv can be used at the target instance host for decryption. In some implementations, a key pair whose private key is only available at the targeted instance host may be used for the encryption and decryption. In other implementations, a private key that is only accessible at the instance host may instead (or in addition) be used in one or more other steps of a multi-step process required for decrypting the credentials as described below. By requiring the use of a private key accessible only at the instance host, decryption of the credentials by any intermediary that copies the encrypted credentials to a different machine may be prevented. The encrypted credentials may be transmitted to the instance host (e.g., to a TPM at the instance host, or to a component of the virtualization management software stack), where the private key may be used to extract the credentials.

In some embodiments, a protocol involving multiple operations may be used to extract the credentials at the instance host. For example, in one implementation, at least the following operations may be performed at the instance host: (a) a verification that a trusted software stack is still being run at the target compute instance and/or the instance host at the time that the decryption is attempted, (b) a verification that the entity or process requesting the decryption of the credentials at the instance host has the appropriate administrative rights for the decryption, and (c) the decryption operation itself. In such an implementation, the decryption of the credentials may fail, or may not be permitted, unless both of the verification operations succeed. In some embodiments, a TPM installed at the instance host may provide a cryptographic key pair of its own, of which the private key is only accessible at the instance host. In some such embodiments, the TPM's private key may be used in one or more of the steps involved in extracting the set of credentials. In one embodiment in which a hash value H1 generated by a TPM at the instance host was previously matched against a set of acceptable hash values to determine whether the instance host met security criteria, the same hash value H1 may be transmitted along with the encrypted credentials and used for re-verifying that a trusted resource stack is being used (e.g., by comparing H1 with a hash value stored internally at the TPM earlier, or by the TPM re-computing a current hash value H2 and verifying that H1 matches H2). To further safeguard the credentials, in at least some embodiments, the extracted credentials may only be stored within non-persistent memory locations to which the client application can be granted access—for example, in the instance host's volatile main memory, in some portion of the instance host's processor caches or hardware registers, or in memory managed by the TPM. Saving the credentials to persistent storage locations (such as one or more rotating disks or solid-state disks) of the instance host, or accessible over a network from the instance host, may not be permitted in view of the stringent security needs of the client in at least some such embodiments.

After the extracted credentials have been accessed from the non-persistent memory locations for use with or by the application(s) for which they were intended, the credentials may be deleted without ever saving them to persistent storage in at least some embodiments. For example, in one embodiment, the client may submit a request to explicitly delete the credentials after they are no longer needed, or the set of credentials may be deleted when the instance is terminated (either at the client's request or at the initiative of the computing service). In some embodiments, an explicit request from the client may not be required for the deletion of the credentials; instead, the credentials may automatically get deleted at some stage after they are used, for example when the corresponding non-persistent memory is freed or re-used for some other purpose. In at least some embodiments, a log of the commands issued to access the decrypted credentials from the non-persistent memory may be maintained, e.g., by the hypervisor or administrative operating system instance at the instance host. At the request of the client (or by default after the credentials are deleted), a digitally signed representation of such a log may be provided to the client. By encrypting the set of credentials in such a way that decryption can only be successfully performed at the targeted instance host, and by avoiding writing the credentials to persistent storage at the instance host, the credentials may be safeguarded to a greater extent than may be possible simply by using common security protocols such as SSL (Secure Sockets Layer), TLS (Transport Layer Security) and the like.

The set of credentials to be used at or by the client's applications at the attested or certified instance host may be generated by a variety of different sources in different embodiments, at least some of which may be located in the client's own network. Such sources may include, for example, a smart card, a PCIe (Peripheral Component Interconnect Express) card-based hardware security module (HSM), or a standalone LAN (Local Area Network) based HSM located within a customer network. In some embodiments, the provider network may implement a security service from which clients may acquire or obtain access to one or more HSM appliances that can also serve as credentials sources for the client's applications. In at least one embodiment, the security service may include attestation/certification entities that maintain lists of hash values corresponding to some set of approved execution environments or resource stacks, and such entities may be utilized by clients to confirm that the proposed instance hosts for their compute instances meet their security requirements. The set of credentials may include, for example, any combination of: a cryptographic key, an application-specific security token, a random number, a nonce value, a sequence number, or a password in various embodiments.

In at least some embodiments, the virtual computing service may implement a number of programmatic interfaces that can be used by clients to request or initiate various security-related operations. For example, a set of application programming interfaces (APIs), web pages, command-line tools, and/or graphical user interfaces (GUIs) may be implemented. A client may utilize one or more of the interfaces to request verification that a particular execution environment's resource stack meets the client's security criteria in one embodiment. Requests to generate the encrypted representation of the set of credentials, and/or to transmit the encrypted representation to the instance host may be made by invoking the programmatic interfaces in some embodiments. Requests to discard the one or more credentials from the non-persistent storage, or to provide the set of credentials to a particular application running at the compute instance may also be made programmatically in at least some embodiments. In at least one embodiment a client may use the programmatic interfaces to request a log of the commands used to access the credentials at the instance host.

In some embodiments, a hardware TPM chip or chipset may be utilized at some or all of the instance hosts to be used for applications that require heightened security. Such a TPM may comprise one or more cryptographic processors or cores that are capable of, among other functions, generating hash values using SHA (Secure Hash Algorithm) or other hashing techniques, generating cryptographic keys using RSA (Rivest, Shamir, Adleman) or other algorithms, and/or generating random numbers. In addition, in some implementations the TPM may include storage comprising a unique private key (corresponding to a public key associated with the TPM), one or more platform configuration registers (PCRs) for security related metrics, attestation identity keys, and/or keys usable for other purposes. In some implementations the private key may be burned into the TPM chip during production. In at least one embodiment, the functionality of a TPM may be implemented largely or entirely in software, e.g., using a virtualized TPM that is also capable of generating hash functions, keys and the like. In some embodiments, mathematical functions other than hash functions may be used for generating values useful in distinguishing between execution environment resources.

Example System Environment

FIG. 1 illustrates an example system environment in which client-specified credentials may be secured at cryptographically attested resources of a provider network, according to at least some embodiments. As shown, system 100 includes a plurality of instance hosts 125 of a virtual computing service implemented at provider network 110, including instance hosts 125A and 125B. The instance hosts 125 may each comprise resources used to execute virtual machines called compute instances (CI) 150, including for example CIs 150A and 150B at instance host 125A, and CIs 150K and 150L at instance host 125B. Each of the instance hosts 125A and 125B comprises a respective trusted platform module or TPM 170, such as TPM 170A at instance host 125A and TPM 170B at instance host 125B. The TPMs may be utilized for implementing a number of security-related features of system 100, such as producing hash values derived from various elements of the execution environment that can be used to verify that the corresponding instance hosts meet clients' security criteria, decrypting and encrypting contents of various communications, generating random numbers and the like. It is noted that not all the instance hosts 125 of the provider network 110 may include TPMs in at least some embodiments.

A resource manager 180 in the depicted embodiment may be responsible for receiving and responding to various requests from client devices 133, as indicated by arrow 148, such as requests for trusted computing platforms to be used for one or more client applications. In response to a request for an execution platform that meets one or more client-specified security-related criteria, in one embodiment the resource manager may select one of the instance hosts 125 that has sufficient capacity (e.g., computing, storage, memory and/or networking capacity) to allow a new instance to be launched on behalf of a client. In accordance with the client's security needs, an instance host such as 125A that includes a TPM 170 may be selected. The TPM on that selected instance host may then generate a hash value that corresponds to the execution environment of the instance host, e.g., based on configuration information pertaining to various elements of the resource stack implemented at the instance host 125. The elements of the resource stack used as input may include, among others, the hypervisor, the BIOS settings, the administrative operating system instance established at the instance host, the guest or non-administrative operating system version that is to be used for the proposed compute instance to be provided to the client, firmware at various devices of the instance host, contents of one or more hardware registers at the instance host, and so on. In some embodiments, the TPM or a similar security module may be granted read access to the various input sources—e.g., it may be permitted to read the contents of the operating system installations at local or remote (e.g., network-accessible) disks of the instance host, the BIOS, the firmware of various devices, the storage where the hypervisor is installed, and so on.

In some embodiments, the hash value generated by the TPM may be transmitted to the client device 133 that requested the execution platform, as indicated by arrow 151. The hash value may then be used to verify that the instance host meets the client's security criteria, e.g., if the hash value matches a pre-computed hash value generated for an execution environment approved by the client. In some embodiments, the client may maintain its own database of approved hash values. In other embodiments, a third-party platform attester 182B outside the provider network may be used, or a platform attester 182A that utilizes provider network resources and is accessible within the provider network may be used to validate the hash value. Either type of attester (internal to or external from the provider network) and/or the client device 133 itself may be provided access to an attested configuration repository 188 that includes a list or collection of hash values corresponding to approved configurations in the depicted embodiment. In at least some embodiments, the attesters may represent a trusted third party entity or organization that has agreed to serve as an arbiter of the security or tampering-related status of a variety of execution platforms. In at least some embodiments, depending on the specificity of the client's requirements, a client may not simply wish to verify that the hash value generated by the TPM matches any of a list of approved hash values, but that it matches a specified one of the approved hash values. For some types of applications, the client may be willing to accept a configuration whose hash value matches any of a set of pre-approved values.

In some embodiments, a compute instance 150 (e.g., 150B) may not be launched on behalf of the client until the client indicates that the appropriate security criteria have been met. In other embodiments, the instance may be launched on a tentative basis prior to the client indicating that the configuration is acceptable. In either scenario, for some types of applications to be run on the launched CI 150, a set of credentials generated from or by one or more credentials sources external to the instance host may be needed. Such credentials sources may be located either outside the provider network 110 (such as credentials source 137 located within the client network 115 from which the request for a trusted execution environment was issued) or within the provider network 110. In some embodiments, the provider network may include a security service 189 that enables clients to obtain access to a number of dedicated hardware security module (HSM) appliances 140, such as HSM 140A or 140B, that can be used as credentials sources by the clients. In contrast to the virtual computing service and/or to other network-accessible services implemented within the provider network, the HSM service may be single-tenant, in that only one client may be allowed to use an HSM appliance 140 at a time. In some embodiments, the security service's HSMs 140 may appear as resources within an isolated virtual network (IVN) set up on behalf of the client using provider network resources. A client may be granted substantial freedom with respect to networking configuration settings for the resources of an IVN, such as for example the ability to assign IP (Internet Protocol) addresses of the client's choice to the HSMs 140 and/or other resources, the ability to configure subnets, set up routing tables, and so on. The client may be able to initialize and manage the cryptographic domain of their HSMs 140 in various embodiments. In some embodiments, the client network's credentials source 137 may include a standalone HSM (i.e., an HSM not associated with a provider network security service) within the client's LAN (local area network), a smart card, and/or a PCIe card-based HSM.

A set of credentials to be used for an application at the client's approved compute instance 150 may be obtained from one or more sources selected by the client in the depicted embodiment. The client may then submit a request to encrypt the set of credentials, e.g., using a public key from a selected key-pair source, and transmit the encrypted credentials to the instance host 125, as indicated by arrows 152 and 153 in the depicted embodiment. At the instance host, the set of credentials may be decrypted (e.g., in a multi-step process involving the use of a private key unique to the instance host), and stored into a non-persistent memory location (e.g., a portion of main memory, a processor cache, or hardware registers) accessible from the client's compute instance 150. The credentials may be utilized from the non-persistent memory location by the client's applications, without writing the credentials to a persistent storage device. Retaining the credentials only in non-persistent memory locations may be a more secure approach than writing the credentials to a persistent storage device such as a disk, which in at least some cases may provide an easier target for malicious entities capable of sophisticated network attacks or physical attacks. After the application has used the set of credentials, the credentials may be disposed of from within the non-persistent storage, e.g., in response to an explicit removal request from the client or when the instance is eventually terminated at the client's request or at the initiative of the resource manager 180. In some implementations a log of accesses to the credentials in the non-persistent memory may be made available to clients.

Example Instance Host Architecture

Figure 2:
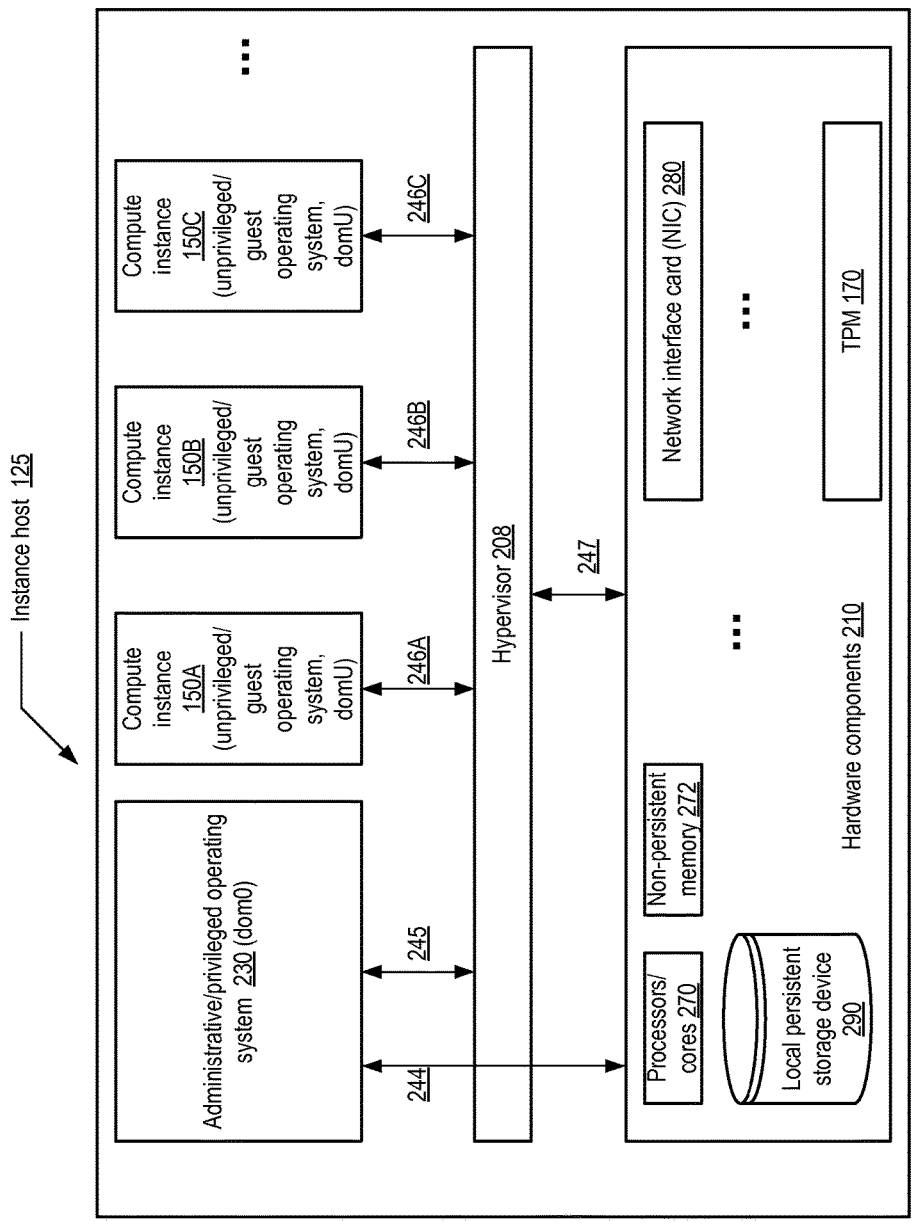
FIG. 2 provides an architectural overview of an instance host that may be used by a virtual computing service, according to at least some embodiments.

FIG. 2 provides an architectural overview of an instance host that may be used by a virtual computing service, according to at least some embodiments. As shown, the instance host 125 may comprise a plurality of hardware components 210, which may include, for example, some number of processing cores or processors 270, at least one non-persistent memory 272 which may be referred to as a main memory, one or more local storage devices 290 such as disks (which may include rotating disks and/or solid state disks), and one or more network interface cards (NICs) 280. Other non-persistent memory locations may also be available among the hardware layer 210 in at least some embodiments, such as various levels of processor cache, registers, and the like. In some embodiments, as mentioned earlier, a hardware trusted platform module 170 may also be incorporated within or attached to the instance host. The TPM itself may comprise a non-persistent memory area in which credentials may be saved in some embodiments. Peripherals such as one or more monitors, mice, and the like (not shown in FIG. 2) may also be attached to the instance host in some implementations.

The hardware resources of the instance host 125 may be virtualized (e.g., presented to several virtual machines or compute instances 150 booted or launched at the instance host as though each of the instances had exclusive access to the hardware) with the help of a virtualization management software stack that comprises a hypervisor 208 and/or an administrative instance of an operating system 230 in the depicted embodiment. The administrative instance of the operating system may be referred to as a "privileged domain" labeled "domain 0" or "dom0" in some implementations, while respective operating systems established for each of the compute instances 232 may be referred to as "unprivileged domains" (labeled "domU"), "guest operating systems", or "guest domains". When a hardware component is to be utilized by a compute instance 150, e.g., due to an operation requested by the operating system or by an application running on top of the operating system, the hypervisor 208 may typically act as an intermediary between the instance and the hardware component, as indicated by the arrows 246A, 246B, 246C and 247 in the depicted embodiment. In some cases, depending for example on the pro-grammatic interfaces being used, both the hypervisor and the administrative operating system instance 230 may be intermediaries between the instance and the hardware. For example, the request path for an operation may flow as follows:
domU→hypervisor→dom0→hypervisor→hardware, and the response may be provided to the instance using the reverse path. In some implementations, dom0 may be able to directly access one or more types of hardware components (as indicated by arrow 244); other interactions between dom0 and the hardware may pass through the hypervisor (as indicated by arrow 245).

In the depicted embodiment, the TPM 170 may comprise one or more cryptographic processors or cores designed specifically for security-related computations such as efficient generation of hash functions, random numbers, keys and the like. The hashing capabilities of the TPM 170 may be used to obtain a hash signature identifying the execution environment of the instance host, e.g., using the hypervisor, dom0, domU, firmware and BIOS as inputs to the hash function. A TPM 170 may have a private key of a public/private key pair "burnt in" in some implementations during manufacturing, such that the private key is not accessible from any other instance host. Such a key pair may be used to secure sets of credentials that are intended for use exclusively at the instance host 125, and nowhere else, in at least some embodiments. For example, the TPM's public key may be made accessible to the client and/or from various credentials sources such as hardware security modules (HSMs) implemented inside or outside the provider network in some embodiments. Prior to transmitting credentials from one of those sources to the instance host 125, they may first be encrypted using the TPM's public key. Because of the manner in which the TPM's private key is "burnt in", such credentials may only be extractable at the particular instance host where the TPM is present. The TPM's private key may be used during one or more operations involved in decrypting encrypted sets of credentials as described above, e.g., in a preliminary step prior to the actual decryption, or in the decryption step itself. In some embodiments, the TPM may also comprise special-purpose non-persistent memory into which the credentials may be extracted, and from which the credentials may be read by applications running at the client's instances. In some embodiments, security components other than TPMs may be used for hash functions, encryption/decryption, and so on. As noted earlier, in at least one embodiment, a virtualized TPM may be implemented largely in software.

Hash Measurements of Execution Environments

Figure 3:
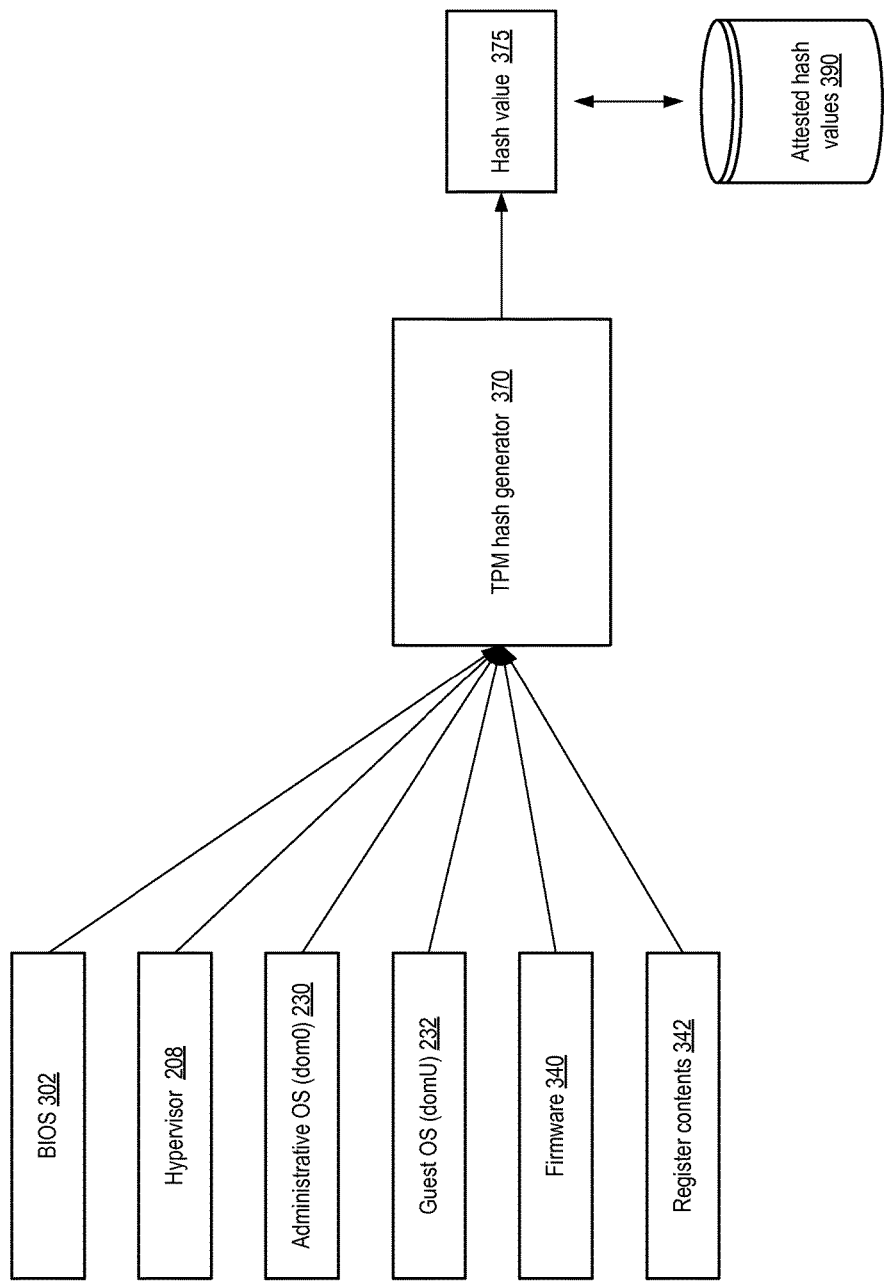
FIG. 3 illustrates examples of input data sources that may be used by a trusted platform module (TPM) to generate a hash value representing an execution environment, according to at least some embodiments.

FIG. 3 illustrates examples of input data sources that may be used by a trusted platform module (TPM) 170 to generate a hash value representing an execution environment, according to at least some embodiments. As shown, the TPM's hash generator 370 may take as inputs various BIOS settings 302, some components or all of the hypervisor 208 (e.g., the software code of the hypervisor), dom0 or the administrative operating system instance 230, the guest operating system or domU to be used for the instance, firmware 340, and/or various register contents 342.

A hash value 375 (sometimes referred to as a hash measurement) representing the configuration of the execution environment may be generated by the TPM. The hash value may then be compared with a set of pre-approved pre-generated hash values, which may be referred to as "attested" hash values 390, to determine whether the execution environment being considered matches an approved configuration. In at least some embodiments, the hash functions being used to generate the value 375 may be selected in such a way that if even one byte of the input (e.g., the software stack, the firmware and/or the register contents included in the input) has been changed with respect to the reference or "attested" configurations, the hash value produced may not match the reference values. In at least some embodiments, the pre-approved hash values corresponding to at least some resource stacks of interest may be obtained by a client, so that the verification of the resource stacks may be performed by the client without interactions with third parties. In other embodiments, trusted attesters or certifiers of resource stacks may be used. Such attesters may be accessible outside the provider network or within the provider network in different embodiments. In at least some embodiments, a hash value 375 generated by a TPM earlier (e.g., as part of the attestation process for the instance host) may be transmitted to the instance host with an encrypted set of credentials, and may be used to re-check that the instance host's resource stack has not been tampered with since the hash value was first generated.

Security-Related Interactions Via Programmatic Interfaces

Figure 4:
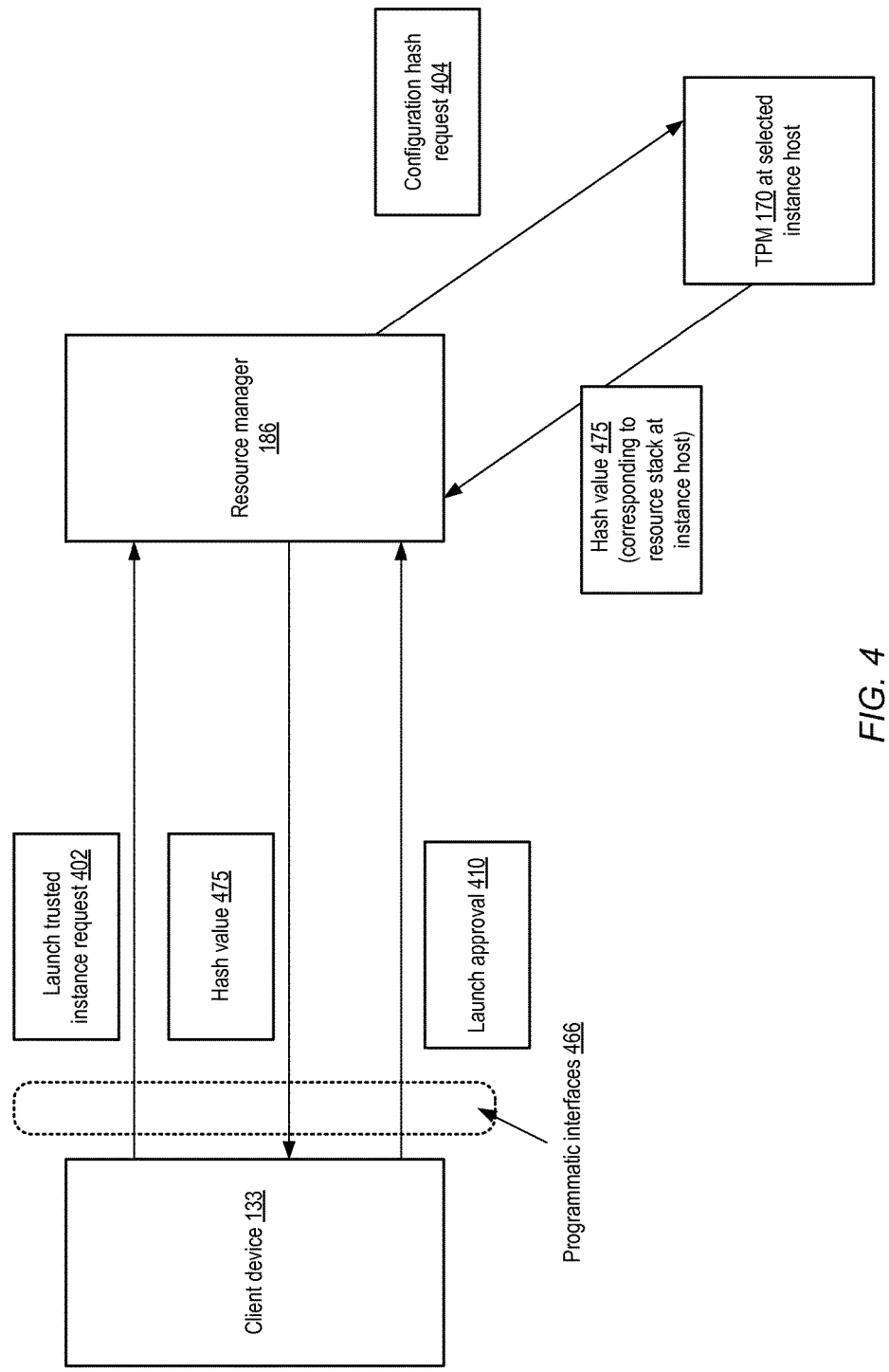
FIG. 4 illustrates example interactions between a client and a resource manager to launch a compute instance using a trusted resource stack, according to at least some embodiments.

As mentioned earlier, in some embodiments a number of programmatic interfaces such as APIs, web pages, GUIs and/or command-line tools may be implemented at the provider network to enable clients to submit security-related requests and to receive corresponding responses. FIG. 4 illustrates example interactions between a client device 133 and a resource manager 180 to launch a compute instance using a trusted resource stack, according to at least some embodiments. As shown, the client may submit a request 402 to launch a trusted compute instance to the resource manager 180 via one of the programmatic interfaces 466. The client may specify, for example, the type or category of instance needed (e.g., by indicating a particular type from among the supported types of compute instances such as "small", "medium" or "large"). In some cases, and depending on the parameters that can be specified via the programmatic interface selected, the client may also indicate other preferences, such as the geographical region in which the instance should preferable be located, the pricing policy selected (if multiple pricing policies are supported by the virtual computing service), the duration for which the instance is needed, and so on. In some implementations, the security requirements of the client may also be indicated in the launch request, e.g., a security policy may be referenced, or one or more security criteria (such as attestation of the execution environment of the instance by a third party) may be included in the request 402.

Upon receiving the launch request, the resource manager 180 may initiate a multi-step process in the depicted embodiment. In the first step, a candidate instance host 125 with sufficient capacity to launch the desired type of instance, and to meet as many of the other client preferences as possible including the security criteria, may be found. For meeting the client's security requirements, an instance host that comprises a hardware or virtual TPM 170 may be selected. In a second step, the resource manager may submit a configuration hash request to the TPM 170. Using various elements of the instance host execution environment as input (such as those illustrated in FIG. 3), the TPM may generate a configuration hash value 475 for the resource stack at the instance host, and transmit the hash value to the resource manager 180.

The resource manager may then include the hash value 475 in a response to the client 433 in a subsequent step. In some embodiments, several different candidate instance hosts may be identified, and the corresponding hash values 475 may all be provided to the requesting client for approval. The client may compare the hash value or values with approved earlier-generated hash values in a database (e.g., a local database maintained by the client or another database maintained by some trusted third party or by a service of the provider network). If one of the hash values is found acceptable, a launch approval message 410 may be transmitted to the resource manager. The client may then be able to access the approved instance. In some embodiments, the instance may be launched or booted after the approval is received, while in other embodiments, the instance may be launched before the approval is received, under the assumption that it is likely to be accepted. In at least one embodiment, if the resource manager 180 is aware of the security requirements of the client (e.g., if the client indicates a desired configuration's hash value to the resource manager), the resource manager may itself check that the candidate instance host meets the requirements before requesting approval from the client. In one embodiment the client may let the resource manager approve the configuration, so the hash value may not need to be transmitted to the client.

Figure 5:
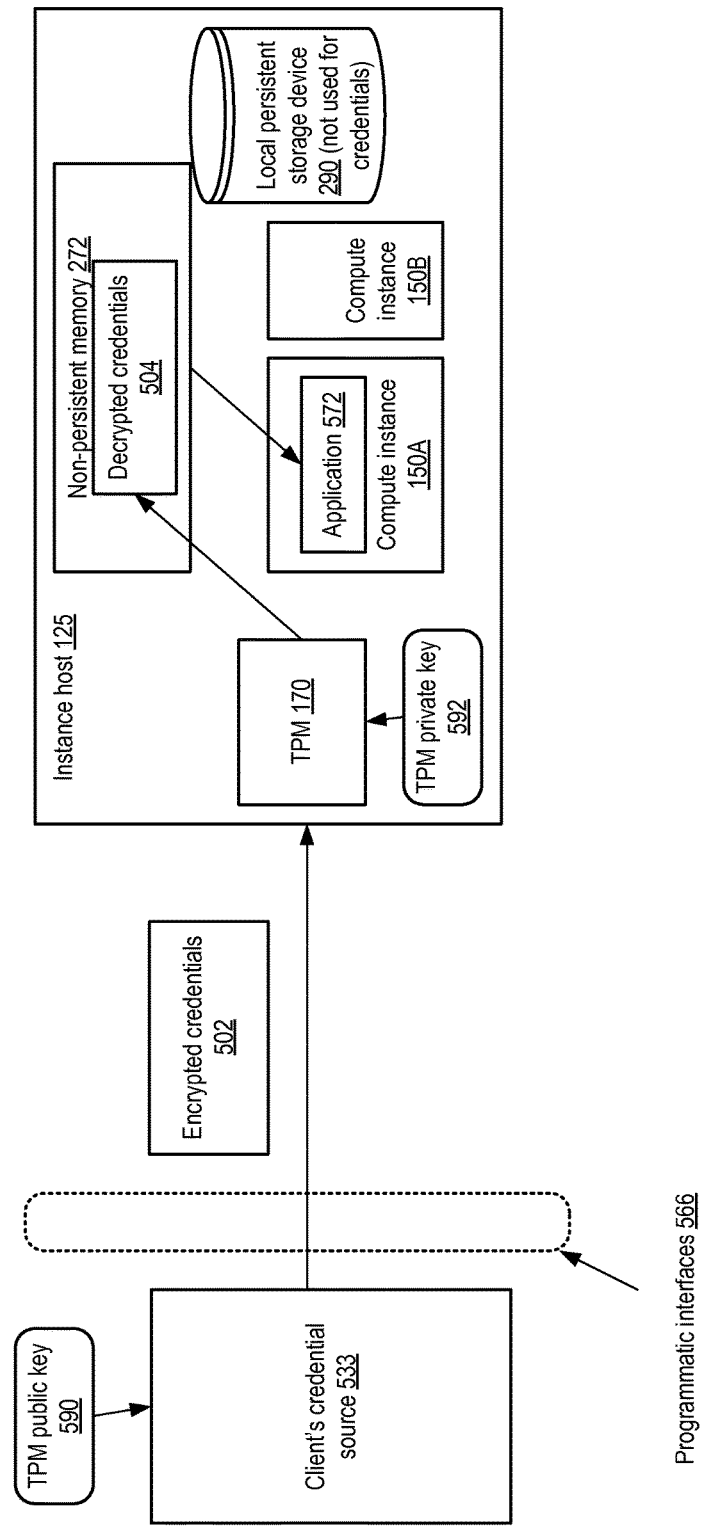
FIG. 5 illustrates an example transmission, extraction and use of customer-specified credentials at a trusted resource stack, according to at least some embodiments.

After an approved instance is launched using a trusted resource stack as outlined above, the client may wish to utilize externally-generated credentials (e.g., keys, passwords, tokens or the like) to execute one or more applications or operating system programs/services at the instance. FIG. 5 illustrates an example transmission, extraction and use of customer-specified credentials at a trusted resource stack, according to at least some embodiments. In the depicted embodiment, a client may utilize a programmatic interface 566 to specify a set of credentials generated by (or available from) a specified source 533 that is to be encrypted and transmitted programmatically to the instance host where the compute instance was launched.

In response to such a credentials transfer request, the credentials may be obtained from the specified source 533 and encrypted prior to transmission, e.g., using a public key 590 associated with the TPM 170 at the instance host. The encrypted credentials 502 may then be sent to the instance host 125 over a network connection. In the depicted embodiment, a private key unique to the instance host 125 (such as the private key 590 associated with the TPM 170, which may not be accessible outside the instance host 125) may be used to extract the set of credentials. The decrypted set of credentials 504 may be stored in non-persistent memory 272 accessible directly or indirectly from the compute instance 232. In at least some embodiments, the credentials may not be saved or copied to local persistent storage devices 290 at the instance host 125, or to network-accessible persistent storage devices. For example, in one embodiment, only a particular application 570 may be permitted to read the set of credentials, and the application 570 may be designed to avoid writing the credentials anywhere. A log of the commands issued to read the credentials may be kept in some embodiments, e.g., by a hypervisor at the instance host, and may be provided to the client upon request. Other applications running at instances such as 150A and 150B may continue to write to local and/or networked storage as needed. In some embodiments, one of the programmatic interfaces implemented may enable a client to request that a pointer to the set of credentials be provided to a specified application 570 to enable the application to access the credentials.

After the set of credentials has been used as desired by the client, in some embodiments the client may wish to discard the credentials as soon as possible, e.g., to reduce the probability of the credentials being obtained by an intruder or malicious entity. Clients may be provided several alternative programmatic interfaces to remove the credentials in some embodiments. FIGS. 6a and 6b illustrate respective examples of client requests that may result in the deletion of decrypted credentials from non-persistent memory at an instance host 125, according to at least some embodiments. In the embodiment depicted in FIG. 6a, the client 133 issues a request 602 via a programmatic interface 636 to delete the decrypted credentials 504 from non-persistent memory 272, e.g., while the application 570 and the compute instance 150A continue to run. Accordingly, in response, the memory space being used for the credentials may be freed and/or overwritten, as indicated by the "X" symbol in FIG. 6a.

Alternatively, in some embodiments, in order to remove the credentials from the non-persistent memory 272, a client may simply submit a request 605 (e.g., via a programmatic interface 637) to terminate the instance 150A at which the credentials were utilized. The TPM 170 and/or one of the components of the virtualization management software stack may recognize that the only instance from which access to the credentials was permitted is to be terminated, and may accordingly ensure that the credentials are deleted/overwritten from the memory 272. Thus, at least in some such embodiments, the client need not specifically indicate that the credentials are to be deleted; instead, the credentials may be deleted permanently from the instance host as a side effect of the termination of an instance that was using the credentials. The two "X" symbols in FIG. 6b indicate that the credentials are deleted and that instance 150A is terminated as a result of the request 605. In some embodiments, neither an explicit deletion request nor an instance termination request may be required—instead, the credentials may be automatically removed from the memory 272 when the memory is freed or garbage-collected, or when the memory is re-allocated for some other purpose.

According to at least some embodiments, a virtualization management stack component such as the hypervisor 208 (or the administrative operating system instance 230, not shown in FIGS. 6a and 6b) may be configured to keep track of all the commands issued or received to access the portion of non-persistent memory in which the credentials were stored at the instance host 125. A log comprising metadata on such commands, such as the instance identifier and the process identifier from which the credentials were read, the times at which the commands were issued, and so on, may be maintained by the hypervisor in the depicted embodiments. In response to a client request, or by default, a digitally signed representation of the credentials access log 642 may be provided to the client 133 by the hypervisor 208 in some embodiments, e.g., after the completion of operations corresponding to the deletion request 602 or the termination request 605. In some embodiments, such a log may be provided on request at any time, e.g., prior to the deletion or termination. In at least one embodiment, the client may request that accesses to the credentials are to be reported in real time—e.g., that a read request for the credentials has to be approved by the client before the requesting application is provided access, or that a record of a read is to be provided to the client as soon as the read occurs.

In at least one embodiment, the TPM or some other cryptographic module at the instance host may by default store the set of credentials in encrypted form (e.g., in non-persistent memory of the TPM) and only decrypt the credentials on demand, when needed by the application 570. In some embodiments, to further enhance security of the various interactions similar to those described above, secure networking protocols such as SSL (Secure Sockets Layer) or TLS (Transport Layer Security) may be used in addition to the use of the key pairs (such as the TPM public/private key pair).

Methods for Securing Client-Specified Credentials at Attested Resources

Figure 7:
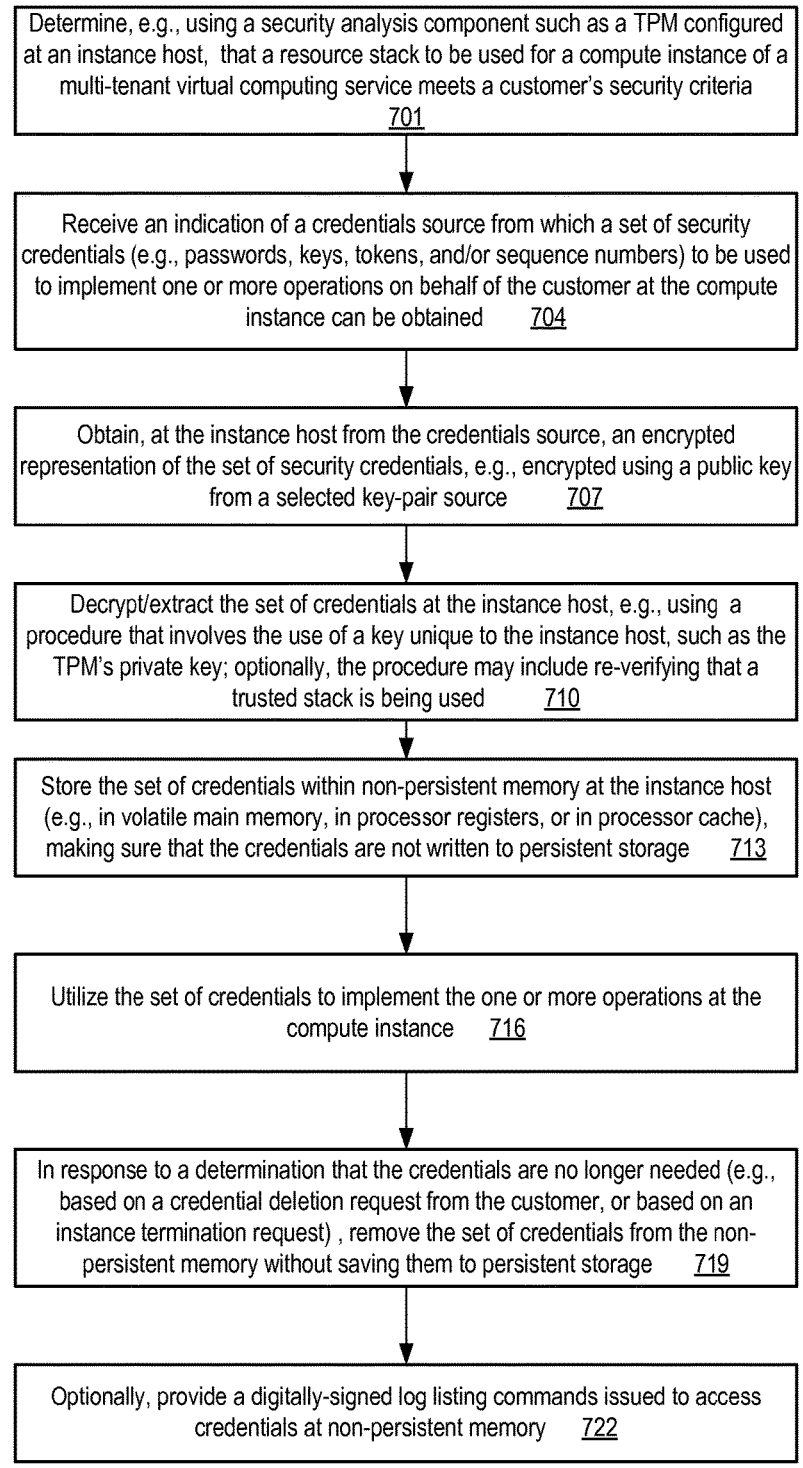
FIG. 7 is a flow diagram illustrating aspects of operations that may be performed to secure client-specified credentials at cryptographically attested resources of a provider network, according to at least some embodiments.

FIG. 7 is a flow diagram illustrating aspects of operations that may be performed to secure client-specified credentials at cryptographically attested resources of a provider network, according to at least some embodiments. As described above, in some embodiments clients of a virtualized computing service implemented at a provider network may wish to utilize trusted secure execution platforms for certain types of applications. Accordingly, such a client may submit a request for a trusted compute instance, e.g., with specified performance and functional capabilities, to a resource manager 180 or some other administrative component of the virtualized computing service. The computing service may identify a candidate instance host that is capable of meeting the requirements of the client. In some embodiments, as indicated in element 701 of FIG. 7, a security analysis component such as a TPM installed or configured at the instance host may be used to determine whether the instance host meets the client's security criteria, e.g., by checking that various components of the hardware, firmware and/or software stacks have not been tampered with. Based on the client's approval, an instance may be launched using a trusted resource stack at a selected instance host.

An indication of a source of security credentials (e.g., keys, tokens, passwords, sequence numbers, random numbers, nonce values, and the like) to be used for operations performed on behalf of the client at the instance host may be obtained, e.g., at an administrative component of the instance host or at the resource manager (element 704). Such credentials sources may include, for example, a smart card, a PCIe (Peripheral Component Interconnect Express) card based hardware security module (HSM), a standalone LAN (Local Area Network) based HSM located within the client network, or an HSM appliance implemented by a network-accessible service of the provider network. Thus, credentials sources may be located either within the client's network or within the provider network. In embodiments in which the provider network implements a network-accessible service that assigns or allocates HSM appliances located within the provider network data centers to clients, e.g., for use within isolated virtual networks of the client, the client may specify the network address or some other identification of such HSM appliance(s) as a source from which credentials are to be obtained. The credentials may be intended for one or more applications, operating system programs or services, or some combination of applications and services at the approved compute instance. In some cases, multiple sources of credentials may be indicated by the client.

The credentials needed at the compute instance may be obtained from the sources, encrypted and transmitted to the instance host. In some embodiments a public key obtained from some selected key-pair source may be used to encrypt the credentials. The encrypted set of credentials may be received at the instance host (element 707). The credentials may be extracted/decrypted at the instance host (element 710), e.g., using a private key unique to the instance host. In some embodiments, a key burnt into a TPM during the TPM's manufacture (and hence only accessible at the instance host where the TPM is installed) may be used for at least one step of a multi-step decryption procedure at the instance host. In some embodiments the multi-step procedure may include re-verifying (e.g., using a hash value that was generated earlier by a TPM and is transmitted to the instance host for use during the decryption procedure) that a trusted resource stack or software is still being used at the compute instance and/or the instance host.

The extracted credentials may be stored within non-persistent memory at the instance host (element 713). For example, in various embodiments, the credentials may be stored within a portion of the main memory of the instance host, within processor caches, or within one or more hardware registers. In at least one implementation, registers, caches or other non-persistent memory locations of a TPM may be used for storing the credentials. In various embodiments, the credentials may not be written to or saved at persistent storage, either at the instance host or at a network-accessible storage device.

The credentials may be utilized for various operations at the compute instance on behalf of the client (element 716). In some implementations, the credentials may be retained in encrypted format until they are needed by the applications or programs, e.g., a just-in-time approach to decryption may be used. After a determination is made that the credentials are no longer needed, the credentials may be removed from the non-persistent memory location (element 719). In some embodiments, the client may explicitly request the deletion of the credentials via a programmatic interface. In at least one embodiment, a request to terminate the instance at which the credentials were used may be interpreted as a signal to delete the credentials from the non-persistent memory. In the depicted embodiment, the credentials may only be stored at (and read from) non-persistent memory of the instance host, and may never be written to persistent storage.

In some embodiments, an audit trail or log of the commands issued from the compute instance to read the credentials from their location(s) in non-persistent memory may be kept at the instance host, e.g., by a component of the virtualization management software such as the hypervisor or the administrative operating system instance. Optionally, in some such embodiments, such a log may be digitally signed and provided to the client either by default or in response to a client request (element 722).

Figure 8:
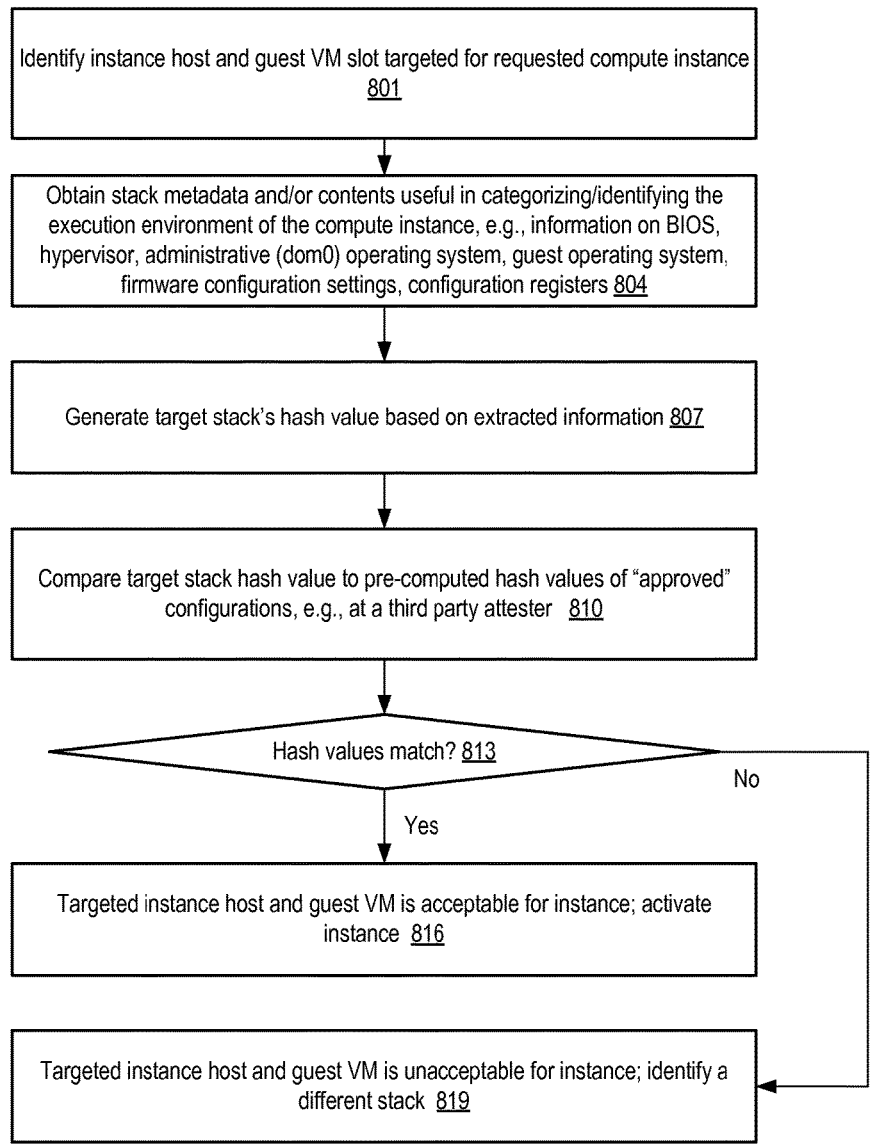
FIG. 8 is a flow diagram illustrating aspects of operations that may be performed to determine whether a resource stack meets a client's security criteria, according to at least some embodiments.

As indicated in element 701 of FIG. 7, in some embodiments a determination may have to be made that a potential target resource stack for a requested instance meets a client's security criteria. FIG. 8 is a flow diagram illustrating aspects of operations that may be performed to make such a determination, according to at least some embodiments. As indicated in element 801, the resource manager or another administrative/control-plane component of the provider network may identify an instance host and a particular slot at the host for a guest virtual machine that can be instantiated in response to a client's request for a compute instance. The slot may represent available capacity with respect to computing, storage, main memory, networking and other features, and whether a given instance host has a slot that is appropriate for a client may depend on the specific type of instance requested in some embodiments. Metadata and/or data pertaining characterizing the resource stack that is potentially to be used for the requested compute instance may be obtained (element 804). Such information may include, for example, BIOS settings, firmware contents, the hypervisor in use at the instance host, the administrative instance of the operating system (dom0) in use, the guest operating system to be used, and/or contents of various configuration registers. In at least some embodiments, a TPM incorporated within the instance host (or at least capable of accessing various components of the instance host) may be used to collect the resource stack information.

A hash value derived from the collected information, and hence representing the resource stack from which the information was collected, may be determined in the depicted embodiment (element 807), e.g., by a TPM associated with the instance host. The computed hash value may be compared with some set of one or more previously computed approved hash values (element 810). The comparison may be performed either by the client (e.g., using a database of approved hash values at the client network) or by some other entity trusted by the client, such as a third-party attester. If the hash value computed for the potential target resource stack matches one of the approved pre-computed hash values (as detected in element 813), the targeted instance host and guest VM may be deemed acceptable and the compute instance may be launched or activated (element 816). If the hash value of the potential target resource stack does not match an approved hash value, the instance host may be rejected and a different instance host and corresponding execution environment may have to be identified (element 819). In some embodiments, the client may specify a particular pre-computed hash value that the targeted resource stack is to meet, so only a single comparison may be required to determine whether the measured resource stack meets the client's security criteria or not.

Figure 9:
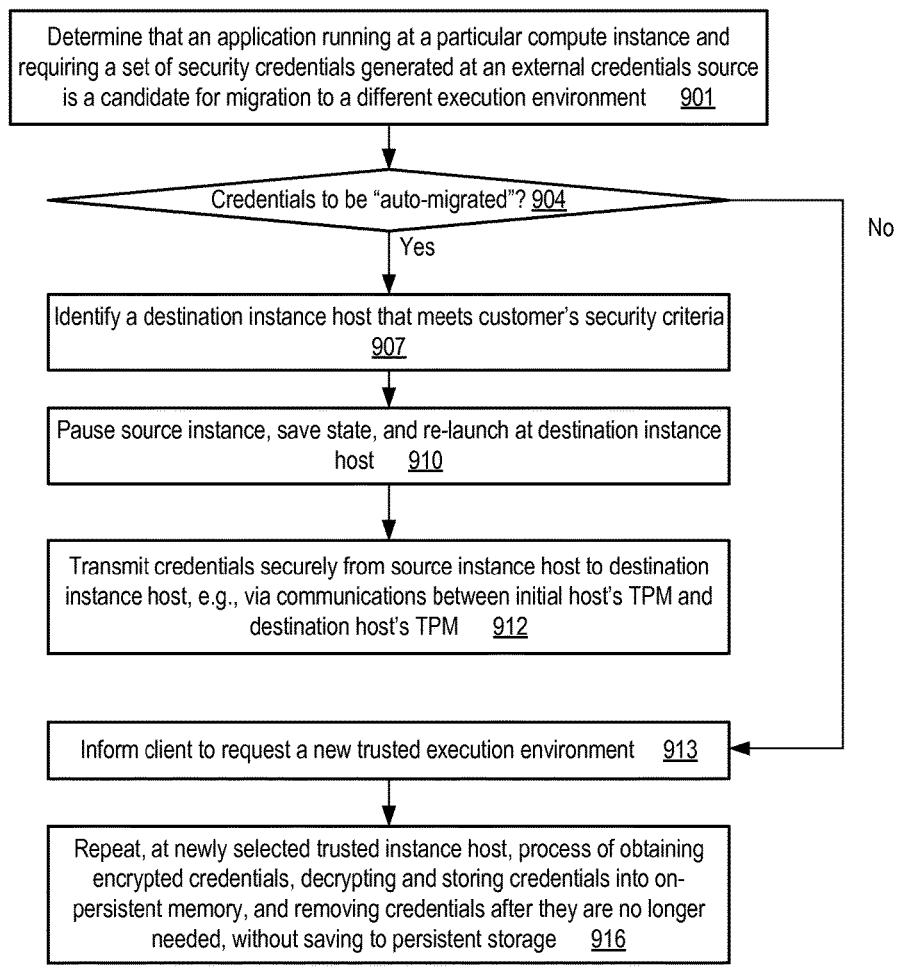
FIG. 9 is a flow diagram illustrating aspects of operations that may be performed to migrate an application that utilizes security credentials from one instance host to another, according to at least some embodiments.

In some embodiments, an application or an entire compute instance may have to be migrated from one instance host (referred to as the source host) to another instance host (the destination host) under certain conditions—e.g., if the resources at the source host are found to be insufficient, if a planned outage is to occur at the source host, or for other reasons. If the techniques described above for identifying a trusted resource stack and subsequently securing credentials for use by the application or compute instance were being used, the security of the destination instance may also have to be verified, and a secure mechanism for transferring the credentials to the destination instance host may have to be used. FIG. 9 is a flow diagram illustrating aspects of operations that may be performed to migrate an application that utilizes security credentials from one instance host to another, according to at least some embodiments.

As shown in element 901, a determination may be made that an application running at a particular compute instance at a source instance host (e.g., at an instance host that has previously been checked for compliance with the client's security requirements) and utilizing a set of externally-generated credentials, is to be migrated to a different instance host. In some embodiments, an automated migration technique may be implemented, in which the computing service is responsible for the migration of the instance and the secure transmittal of the credentials to a trusted destination instance host. If such an automated migration feature is to be used (as determined in element 904), the service may first identify a destination instance host that meets the client's security criteria (element 907), as well as the client's performance and other requirements. An approach similar to that illustrated in FIG. 8 may be used for verifying security, except that in the automated migration scenario the computing service rather than the client may be responsible for approving the destination instance host. In at least some embodiments, in order to meet the client's security criteria, the destination instance hosts' resource stack may be required to have the same hash value as the source instance host. In other embodiments, a different hash value (e.g., one that matches a different pre-computed approved hash value) may suffice.

In some embodiments, both the source and destination instance hosts may be required to be configured with a respective TPM with equivalent features and capabilities. After a trusted destination host has been found, the source instance's execution may be paused and its state saved. A replacement/migrated instance corresponding to the source instance may be launched at the destination instance host using the saved state (element 910). The credentials may be transferred securely from the source host to the destination host (element 912). In some embodiments in which both instances comprise TPMs, such a transfer may involve interactions/communications between the source and destination TPMs, and may for example include the use of the destination TPM's public/private key pair. For example, the source instance host's TPM may encrypt the credentials using the destination TPM's public key before sending the encrypted credentials to the destination TPM. After the credentials are received at the destination instance host, they may be decrypted (e.g., using the destination TPM's private key) and stored within non-persistent memory. The application that is to use the credentials may then read the decrypted credentials from the non-persistent memory at the destination instance host. The selection of the destination instance host, the migration of the compute instance and the application, as well as the secure transfer of the credentials, may all be performed without interactions with the client if automated migration is used.

In at least some embodiments, automated migration of credentials may not be supported, or at least an alternative to automated migration option may be provided to the client. If such a non-automated migration approach is taken (as also determined in element 904), the client may have to re-establish a new trusted execution environment. The client may be notified to request a trusted execution environment (element 913) in a manner similar to that described earlier with respect to FIG. 4. After a new destination instance host that meets the client's security criteria is found, the client may request a launch of a second (migrated) instance there. The set of credentials may once again be obtained from a specified credentials source and encrypted prior to transmittal to the destination (element 916). When the encrypted credentials are received at the destination instance host, they may be decrypted using a key unique to the destination instance host and stored in non-persistent memory. After the credentials are no longer needed at the destination host, they may be removed from the non-persistent memory without being saved in persistent storage.

It is noted that in some embodiments, at least some of the operations illustrated in the flow diagrams of FIGS. 7, 8 and 9 may be performed in a different order than that shown, and that some sets of operations may be performed in parallel. In other embodiments, some of the operations shown in these flow diagrams may be omitted or replaced by different operations.

Use Cases

The techniques described above, of identifying trusted execution environments for compute instances that are to perform security-related operations, and of securing the transfer and use of externally-generated credentials for such operations, may be useful for a wide variety of customers. Many modern applications and protocols that require high levels of security may also require substantial computing capabilities, which may in some cases be more economically obtained from provider networks than at client-owned premises, even though at least some of the credentials sources may remain within client-owned premises. Securing the transmittal of the credentials to the platforms where the security-related applications are to be executed, and reducing the probability of the exposure of such credentials to intruders or hackers may be essential. In addition, at least some provider networks may be able to deploy large numbers of instance hosts (with different levels of performance capacities and hence different numbers and sizes of instance slots) equipped with trusted platform modules (TPMs), which may make it easier for clients to select the appropriately-sized compute instances for their security-related applications and to scale such applications over time. Some provider networks may also implement additional security services, including for example cloud-based hardware security modules (HSMs) that can serve as sources of credentials such as keys that are to be used for security-related applications.

Illustrative Computer System

Figure 10:
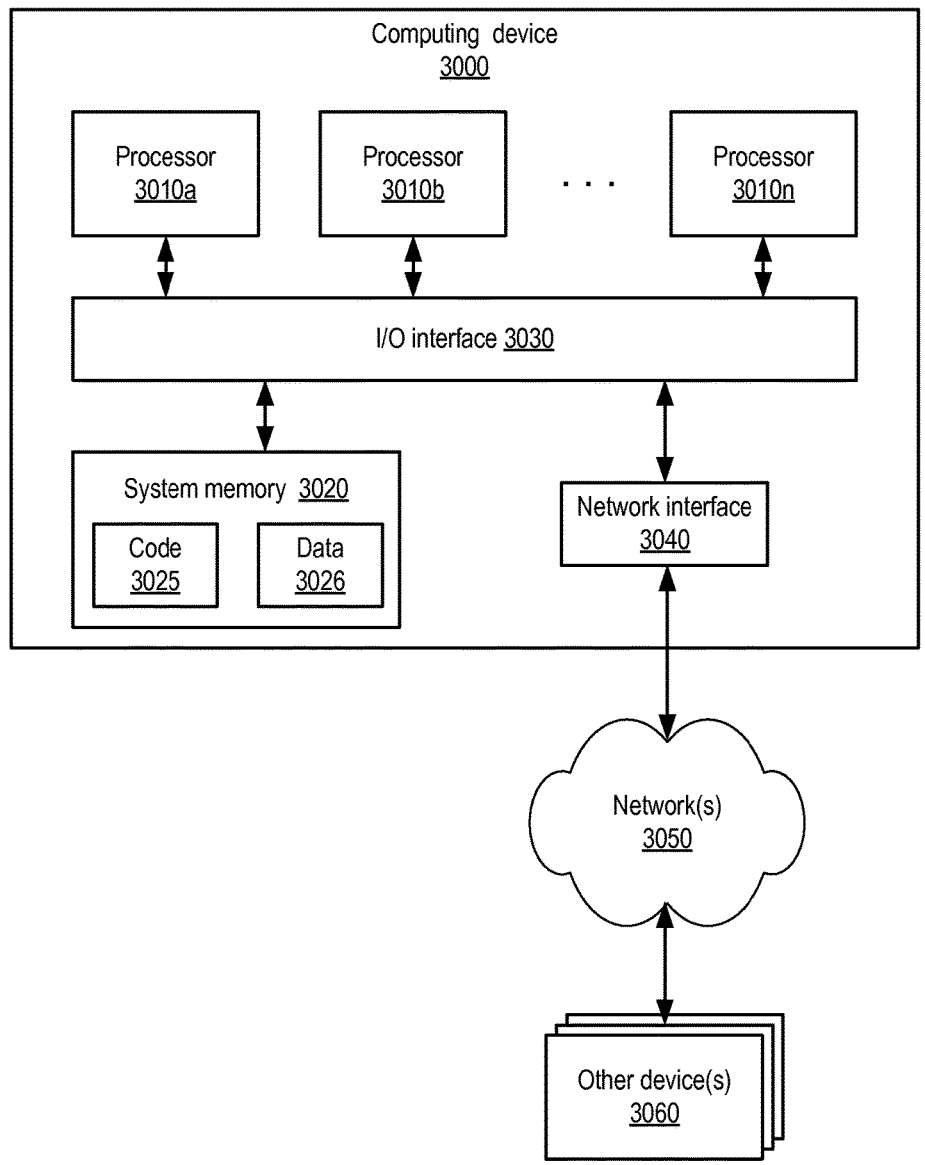
FIG. 10 is a block diagram illustrating an example computing device that may be used in at least some embodiments.

In at least some embodiments, a server that implements a portion or all of one or more of the technologies described herein, including the techniques to implement the various components of the resource manager, the instance hosts, and the like, may include a general-purpose computer system that includes or is configured to access one or more computer-accessible media. FIG. 10 illustrates such a general-purpose computing device 3000. In the illustrated embodiment, computing device 3000 includes one or more processors 3010 coupled to a system memory 3020 (which may comprise both non-volatile and volatile memory modules) via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA. In some implementations, graphics processing units (GPUs) may be used instead of, or in addition to, conventional processors.

System memory 3020 may be configured to store instructions and data accessible by processor(s) 3010. In at least some embodiments, the system memory 3020 may comprise both volatile and non-volatile portions; in other embodiments, only volatile memory may be used. The volatile portions of the system memory of an instance host may be used to store the decrypted credentials in at least some embodiments. In various embodiments, the volatile portion of system memory 3020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 3020 as code 3025 and data 3026. As noted earlier, in at least some embodiments, the computing device 3000 may also include a hardware trusted platform module (TPM) (not shown in FIG. 10).

In one embodiment, I/O interface 3030 may be configured to coordinate I/O traffic between processor 3010, system memory 3020, and any peripheral devices in the device, including network interface 3040 or other peripheral interfaces such as various types of persistent and/or volatile storage devices. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIG. 1 through FIG. 9, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIG. 1 through FIG. 9 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices configured to:
determine, based at least in part on an analysis performed using a trusted platform module (TPM) associated with an instance host of a provider network, that a plurality of resources deployed for execution of a compute instance of a multi-tenant computing service at the instance host on behalf of a client meet one or more security criteria, wherein the analysis comprises:
compare a hash value of the instance host that is generated by the TPM prior to the execution of the compute instance with an approved hash value that is included in a set of approved hash values stored in an attested configuration repository, wherein the set of approved hash values corresponds to configurations of the instance host approved by the client to execute the compute instance;
initiate the execution of the compute instance at the instance host on behalf of the client according to a determination that the plurality of resources deployed for the execution of the compute instance meet the one or more security criteria;
receive, at the instance host from a credentials source indicated by the client, an encrypted representation of a set of credentials usable by one or more client applications or programs running on the compute instance to perform one or more operations of the one or more client applications or programs;
verify that a trusted resource stack is running at the compute instance based at least in part on a comparison of the hash value and a second hash value of the instance host that is generated by the TPM during the execution of the compute instance;

verify that the one or more client applications or programs have administrative rights for the instance host to decrypt the credentials;

in response to a verification that the trusted resource stack is running at the compute instance and a verification that the one or more client applications or programs have the administrative rights, extract, at the instance host, the credentials from the encrypted representation based at least in part on decrypting the encrypted representation using a private key unique to the TPM;

store the credentials at a non-persistent memory location accessible from the compute instance;

perform the one or more operations of the one or more client applications or programs running on the compute instance, wherein the one or more client applications or programs are configured to use the credentials during the execution of the compute instance and the one or more client applications or programs; and remove the credentials from the non-persistent memory location, without saving the credentials to a persistent store, in response to performance of the one or more operations using the credentials.

2. The system as recited in claim 1, wherein the trusted resource stack corresponds to the hash value generated by the TPM, and wherein the hash value generated by the TPM is based at least on part on one or more of (a) a BIOS (basic input/output system) setting of the instance host, (b) a configuration of a hypervisor installed at the instance host, (c) a configuration of a guest operating system to be used for the compute instance, (d) a configuration of an administrative operating system installed at the instance host for virtualization management, (e) firmware of one more peripheral devices attached to the instance host, or (f) values stored in one or more hardware configuration registers.

3. The system as recited in claim 1, wherein the instance host is further configured to receive the hash value with the encrypted representation.

4. The system as recited in claim 1, wherein the set of credentials is generated at one of: (a) a smart card, (b) a hardware security module, or (c) an HSM appliance implemented by a network-accessible service of the provider network.

5. The system as recited in claim 1, wherein the one or more computing devices configured to:

launch, at the instance host, the compute instance on a tentative basis;

receive, from the client, approval of the client to launch the compute instance; and in response to the approval, launch, at the compute instance, the trusted resource stack.

6. A method, comprising:

performing, by one or more computing devices:

determining whether an instance host of a computing service meets security criteria based at least in part on an analysis performed using a trusted platform module (TPM) at the instance host, comprising:

comparing a hash value of the instance host generated by the TPM prior to execution of a compute instance with an approved hash value that is included in a set of approved hash values stored in an attested configuration repository, wherein the set of approved hash values corresponds to configurations of the instance host approved to execute the compute instance;

initiate the execution of the compute instance at the instance host according to a determination that the instance host meets the security criteria;

receiving, at the instance host, an encrypted representation of one or more credentials usable by one or more client applications or programs running on a compute instance at the instance host to perform one or more operations of the one or more client applications or programs;

determining whether the instance host is permitted to decrypt the encrypted representation of the one or more credentials, comprising:

verifying that a trusted resource stack is running at the instance host based at least in part on a comparison of the hash value and a second hash value of the compute instance host that is generated by the TPM during the execution of the compute instance; and verifying that the one or more client applications or programs have administrative rights to allow the instance host to decrypt the one or more credentials;

in response to a verification that the trusted resource stack is running at the instance host and a verification that the one or more client applications or programs have the administrative rights, extracting, at the instance host, the one or more credentials from the encrypted representation into a non-persistent memory location at the instance host based at least in part on decrypting the encrypted representation using a private key available at the instance host;

performing the one or more operations of the one or more client applications or programs running on the compute instance, wherein the one or more client applications or programs are configured to use the one or more credentials during the execution of the compute instance and the one or more client applications or programs; and in response to performing the one or more operations, discarding the one or more credentials from the instance host, without saving the one or more credentials to a persistent store.

7. The method as recited in claim 6, wherein the comparing the hash value of the instance host is performed by a third-party platform attester configured to access the attested configuration repository.

8. The method as recited in claim 7, wherein said trusted platform module comprises one of: (a) a hardware cryptographic processor or (b) a virtualized cryptographic processor comprising one or more software modules.

9. The method as recited in claim 7, wherein verifying that the instance host is running the trusted resource stack comprises:

generating a new hash value by the TPM; and comparing the hash value with the new hash value.

10. The method as recited in claim 6, wherein the hash value generated by the TPM is based at least on part on one or more of (a) a BIOS (basic input/output system) setting of the instance host, (b) a configuration of a hypervisor installed at the instance host, (c) a configuration of a guest operating system to be used for the compute instance, (d) a configuration of an administrative operating system installed at the instance host for virtualization management, (e)

firmware of one more peripheral devices attached to the instance host, or (f) values stored in one or more hardware configuration registers.

11. The method as recited in claim 6, wherein the one or more credentials are generated at one of: (a) a smart card, (b) a hardware security module (HSM), or (c) an HSM appliance implemented by a network-accessible service of a provider network, and wherein the one or more credentials comprises one or more of: a cryptographic key, an application-specific security token, a random number, a nonce value, a sequence number, or a password.

12. The method as recited in claim 6, further comprising determining whether the one or more credentials are no longer needed based at least in part on determining whether the one or more client applications or programs have been terminated, wherein discarding the one or more credentials from the instance host is performed in response to a determination that the one or more credentials are no longer needed.

13. The method as recited in claim 6, wherein extracting the one or more credentials using the private key available at the instance host comprises decrypting the encrypted representation based at least in part on the private key, wherein the private key is burned into a hardware component of the instance host.

14. The method as recited in claim 6, further comprising performing, by the one or more computing devices:
    implementing a set of programmatic interfaces enabling the one or more client applications or programs to request one or more security-related operations associated with the compute instance; and
    receiving, via a programmatic interface of the set, one or more of: (a) a request to verify one or more resources of the instance host meets the security criteria, (b) a request to generate the encrypted representation, (c) a request to transmit the encrypted representation to the instance host, (d) a request to discard the one or more credentials, (e) a request to provide, to a particular application running at the compute instance, an indication of a particular credential of the one or more credentials, or (f) a request for a log of commands issued to access the one or more credentials at the instance host.

15. The method as recited in claim 6, further comprising performing, by the one or more computing devices:
    determining that the compute instance is to be migrated to a different instance host of a provider network;
    identifying a second instance host that meets the security criteria;
    saving state information of the compute instance;
    pausing execution of the compute instance;
    launching a second compute instance at the second instance host using the saved state information; and
    securely transmitting the one or more credentials to the second instance host.

16. A non-transitory computer-accessible storage medium storing program instructions that when executed on one or more processors cause the one or more processors to:
    initiate execution of a compute instance at an instance host according to a determination that the instance host meets one or more security criteria based at least in part on an analysis performed using a trusted platform module (TPM) associated with the instance host;
    receive, at the instance host, an encrypted representation of one or more credentials usable by one or more client applications or programs running on the compute instance to perform one or more operations of the one or more client applications or programs;
    compare a hash value of the instance host generated by the TPM prior to the execution of the compute instance with an approved hash value that is included in a set of approved hash values stored in an attested configuration repository, wherein the set of approved hash values corresponds to configurations of the instance host approved to execute the compute instance;
    verify that a trusted resource stack is running at the instance host based at least in part on a comparison of the hash value and a second hash value of the instance host that is generated by the TPM during the execution of the compute instance;
    verify that the one or more client applications or programs have administrative rights to allow the instance host to decrypt the credentials;
    in response to a verification that the trusted resource stack is running at the compute instance and a verification that the one or more client applications or programs have the administrative rights, extract, at the instance host, the one or more credentials from the encrypted representation based at least in part on decrypting the encrypted representation using a private key unique to the instance host;
    utilize the one or more credentials to perform the one or more operations of the one or more client applications or programs, wherein the one or more client applications or programs are configured to utilize the one or more credentials during the execution of the compute instance and the one or more client applications or programs; and
    in response to performance of the one or more operations, remove the one or more credentials from the instance host, without saving the one or more credentials to a persistent store.

17. The non-transitory computer-accessible storage medium as recited in claim 16, and wherein the hash value generated by the TPM is based at least on part on one or more of (a) a BIOS (basic input/output system) setting of the instance host, (b) a configuration of a hypervisor installed at the instance host, (c) a configuration of a guest operating system to be used for the compute instance, (d) a configuration of an administrative operating system installed at the instance host for virtualization management, (e) firmware of one more peripheral devices attached to the instance host, or (f) values stored in one or more hardware configuration registers.

18. The non-transitory computer-accessible storage medium as recited in claim 16, wherein the instructions when executed at the one or more processors cause the one or more processors to:
    receive a client instruction to terminate the one or more client applications or programs, wherein removing the one or more credentials from the instance host is in response to receiving the client instruction.

19. The non-transitory computer-accessible storage medium as recited in claim 16, wherein the instructions when executed at the one or more processors cause the one or more processors to:
    determine whether a component of the instance host has been tampered with, wherein the one or more security criteria is based at least in part on a determination that the component of the instance host has not been tampered with.

20. The non-transitory computer-accessible storage medium as recited in claim 16, wherein the instructions when executed on the one or more processors cause the one or more processors to:
 store a log record of one or more commands issued to access at least one credential of the one or more credentials at the instance host; and
 provide a representation of the log record to the one or more client applications or programs via a programmatic interface.

* * * * *